United States Patent [19]

Knohl

[11] 4,334,815
[45] Jun. 15, 1982

[54] FASTENER WITH A MODIFIED THREAD FORM

[75] Inventor: Rudolph E. Knohl, Bartlett, Ill.

[73] Assignee: Illinois Tool Works Inc., Chicago, Ill.

[21] Appl. No.: 161,962

[22] Filed: Jun. 23, 1980

[51] Int. Cl.³ .............................................. F16B 25/00
[52] U.S. Cl. .................................. 411/368; 411/389; 411/411; 411/423
[58] Field of Search ............... 411/389, 388, 308, 309, 411/310, 311, 307, 368, 366, 371, 411

[56] References Cited

U.S. PATENT DOCUMENTS

| | | | |
|---|---|---|---|
| 658,086 | 9/1900 | Higbee | 411/276 |
| 1,447,056 | 2/1923 | Bates | 411/307 |
| 2,269,476 | 1/1942 | Poupitch | 411/312 |
| 3,133,578 | 5/1946 | Moskovitz | 411/309 |
| 3,207,023 | 9/1965 | Knohl | 411/387 |
| 3,301,299 | 1/1967 | Stanwick | 411/309 |
| 3,342,234 | 9/1967 | Evans | 411/311 |
| 3,351,115 | 11/1967 | Boehlow | 411/168 |
| 3,426,820 | 2/1969 | Phiphard | 411/310 |
| 3,794,092 | 2/1974 | Carlson et al. | 411/310 |
| 3,897,713 | 8/1975 | Gugle | 411/389 |
| 3,907,017 | 9/1975 | Stanwick | 411/311 |
| 4,040,328 | 8/1977 | Muenchinger | 411/412 |

*Primary Examiner*—Ramon S. Britts
*Attorney, Agent, or Firm*—Thomas W. Buckman; Richard K. Thomson; Jack R. Halvorsen

[57] ABSTRACT

A fastener with a modified thread form discourages a nut from becoming irremovably frozen on the shank of a bolt. A first normal thread extends from a base reference surface to a height on the fastener shank to permit full thread engagement by a nut. Axially outwardly along the shank from that point, there is provided a second thread of reduced crest diameter but still of sufficient size to engage the threads on the nut. This reduction in thread diameter provides additional clearance to permit the nut to be backed off in spite of marred threads or paint or rust buildups.

5 Claims, 4 Drawing Figures

FASTENER WITH A MODIFIED THREAD FORM

BACKGROUND AND SUMMARY OF THE INVENTION

It is a reoccurring problem in the use of nuts and bolts that the nut becomes frozen on the shank of the bolt. This generally results from the fact that the portion of the bolt which extends beyond the nut is coated with paint or, if not, rusts. Also, this exposed shank portion can be nicked or bumped marring the threads. Then, when it is time to remove the nut, as the nut moves axially off the shank, the paint and rust particles build up between the mating threads increasing the rotational torque necessary for removal to a point where removal without damaging the threads becomes impossible. Or, in the case of marred threads, the nut cannot be removed unless new threads are cut.

This problem can be even greater with a double-ended stud. In one such application, one end of the stud has a self-tapping thread form which is received in a comparatively soft material such as plastic. A nut attaches the stud to a base member which may be a layer of sheet metal. The entire assembly is then coated with paint. It is generally necessary to loosen the nuts to effect adjustment of the plastic layer with respect to the sheet metal. As the nut is removed, again, the paint and marred thread act to increase the resistance to removal. If the nut locks on the second threaded shank, the double-ended stud will rotate with the nut causing it to rotate out of the plastic. Proper re-seating of the fastener is difficult and, it may not be possible to firmly reseat the stud.

The present invention eliminates such unwanted locking of threads between a nut and bolt. The threads nearest the terminal end and, in fact, all threads projecting beyond the surface of the nut, have a thread crest diameter which is less than that of the threads which mate with the nut. The thread crest height in this region is still sufficient to engage with the internal threads of the nut but, is sufficiently reduced to provide adequate clearance for paint and rust particles as well as provide room to clear marred threads.

The features, advantages and objects of the present invention will be more fully understood following a reading of the following specification when taken in conjunction with the accompanying drawings.

DETAILED DESCRIPTION OF THE PREFERRED EMBODIMENTS

Figure 1:
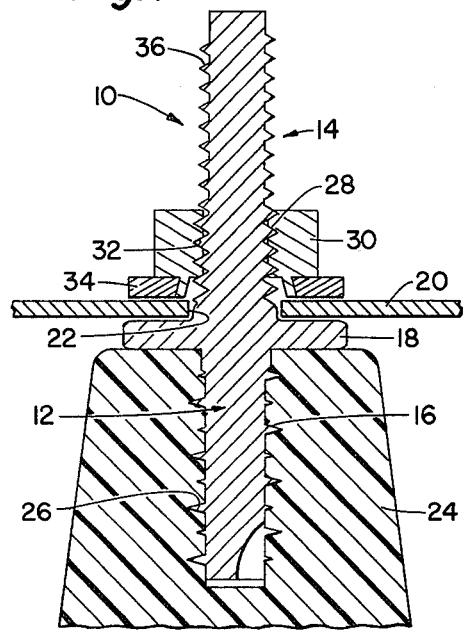
FIG. 1 is a cross-sectional side view of a double-ended stud shown in engagement position.

The fastener of the present invention is depicted as a double-endedstud 10. The first shank end 12 of the stud has a self-tapping thread form 16 which may comprise a twin-lead thread of the type which is disclosed and claimed in U.S. Pat. No. 3,207,023. This first shank end 12 is received in a comparatively soft material, shown here as a plastic boss 24 of a tail light cover. The close tolerance between the recess 26 and shank 12 depicted in FIG. 1 is a result of the plastic material cold-flowing into engagement therewith. When originally formed, recess 26 is slightly larger than the root diameter of shank 12.

A second shank end 14 is separated from the first shank end 12 by a laterally extending flange 18. This second shank end is received in aperture 22 in the sheet metal base member 20. Shank end 14 has a first series of thread convolutions 28 which mate with and have normal full engagement with internal threads 32 on nut 30. This first series of convolutions 28 extend to the top of nut 30 when they are in operative engagement. In other words, thread convolutions 28 extend upwardly from flange 18 a distance equal to the height of the nut 30 plus the thickness of the base member 20 plus, in this case, the thickness of washer 34. As shown, washer 34 is captured by nut 30 but can still rotate relative thereto.

A second series of thread convolutions 36 extend along the remainder of shank end 14. These thread convolutions have a crest diameter which is less than that of thread convolutions 28 but still of sufficient size to engage the threads 32 of nut 30. This reduction in diameter will provide clearance between the flanks of threads 32 and threads 36. This clearance is ample to permit several coats of paint and substantial thread deflection to occur without the nut binding during removal.

Figure 2:
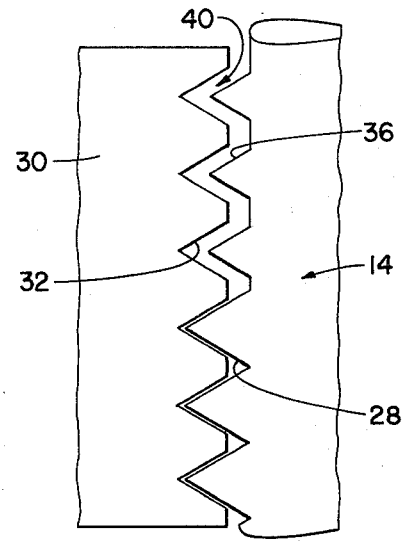
FIG. 2 is a schematic enlargement of the nut in engagement with the fastener showing one embodiment of the clearance thread.
Figure 3:
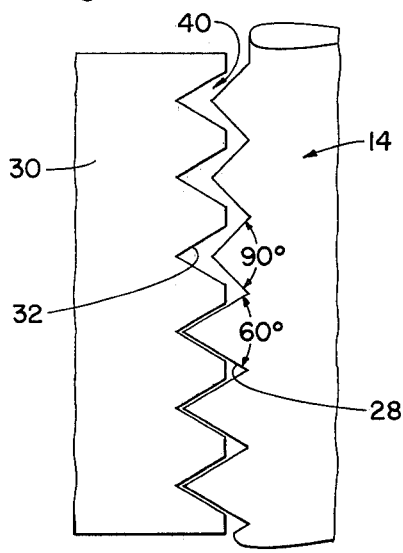
FIG. 3 is a schematic enlargement similar to FIG. 2 depicting a second embodiment of the clearance thread.
Figure 4:
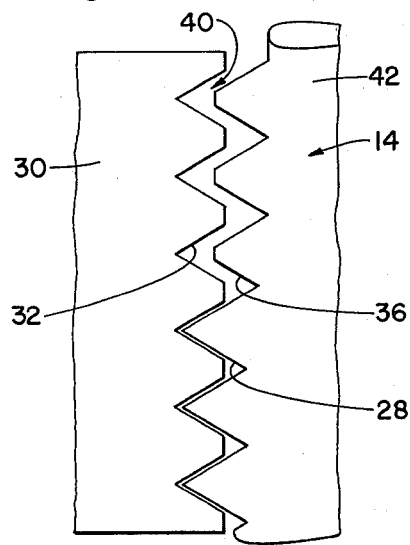
FIG. 4 is a schematic enlargement similar to FIGS. 2 and 3 depicting yet a third embodiment of the clearance thread.

FIGS. 2–4 detail schematically several forms that thread convolutions 36 may take. FIG. 2 shows a spaced thread 36 rolled on a standard diameter blank. This provides a clearance area 40 with respect to the internal threads 32 of the nut. FIG. 3 shows an alternative configuration in which the thread convolutions 36 are rolled with a 90° included angle while threads 28 have a 60° included angle. In addition to providing clearance area 40, this embodiment has the additional benefit that thread convolutions 36 having a stronger configuration which is less likely to become marred or distorted due to its exposure. FIG. 4 shows yet another embodiment in which threads 36 are rolled on a portion 42 of the shank end 14 which has a reduced diameter. In addition, threads 36 are not formed as sharp crested threads but rather as truncated threads which also have a stronger, more mar-resistant shape.

Although the fastener of the present invention has been described in terms of a double-ended stud, it will be appreciated that it is applicable to other threaded fasteners as well. Further, it will be appreciated that the features of the FIG. 4 embodiment could be used independently. For example, the reduced diameter threads of the FIG. 1 embodiment could be truncated or formed on a reduced diameter blank portion. Other changes, modifications and alternatives will become apparent to a person of ordinary skill in the art following a reading of the foregoing specification. Accordingly, it is intended that all such changes, modifications and alternatives as come within the scope of the appended claims be considered to be part of the present invention.

I claim:

1. In combination a double-ended stud having a first thread configuration on one end for tapping into relatively soft material and a second cylindrical thread configuration on the other end, an internally threaded nut cooperatively adapted to engage said second thread configuration in order to secure said soft material to a base member, said two thread configurations being separated by a laterally extending flange, said second thread configuration having a first series of thread convolutions of a predetermined axial extent and which mate with and have normal full engagement with, the internal thread of said nut, said nut having a washer associated therewith, said first series of thread convolutions predetermined axial extent being defined by a distance extending axially along said second stud end to a point which is spaced from said flange a distance which is not greater than the sum of the height of the nut plus the thickness of said washer plus the thickness of said base member, a second series of thread convolutions in excess of one thread turn in said second thread configuration and positioned along said second stud end at an axial location which is farther from said flange than said first series of thread convolutions, said second series of convolutions having a thread diameter which is less than that of said first convolutions but of a diameter which will still provide partial engagement with the internal thread of the nut whereby, when the nut is removed from the second stud end, the reduced diameter of said second series of convolutions will provide substantially circumferentially continuous clearance for paint particles and the like, so as to avoid loosening of said first stud end in said comparatively soft material.

2. The double-ended stud of claim 1 wherein the second series of thread convolutions have a greater included thread angle than the first series of thread convolutions have.

3. The double-ended stud of claim 1 wherein the second series of thread convolutions are a spaced thread and have spaces interspersed between their roots to provide additional clearance.

4. The double-ended stud of claim 1 wherein the crests of the second series of thread convolutions are truncated.

5. In combinatiion a threaded fastener having a shank with a reference base adjacent a first end and a second end comprising a free terminal end, a first series of threads adjacent the reference base, an internally threaded nut adapted to cooperatively engage said first series of threads, said first series of thread being configured to mate with, and have normal full engagement with, the internal threads of said nut, said first series of threads having a first thread crest diameter and a predetermined axial extent along said shank as defined by a distance from said reference base which is generally equal to the height of the nut plus the thickness of material to be secured plus the thickness of any washer associated with said nut, a second series of threads in excess of one thread turn and positioned nearer to said terminal end than said first series, said second series of threads having a thread crest diameter which is less than the diameter of said first series of threads but still having sufficient dimension to provide partial engagement with the internal thread of the nut whereby, when the nut is removed from the shank of the fastener, the reduced diameter of said second series of threads will provide substantially circumferentially continuous clearance for paint particles, marred threads, rust, and the like, so as to prevent the nut from becoming frozen on the fastener shank and discouraging removal.

* * * * *